INVENTOR.
PETER G. JACKSON
BY
Ervin B. Steinberg
AGENT.

June 13, 1961 P. G. JACKSON 2,988,689

MAGNETIC AMPLIFIER

Filed May 20, 1959 2 Sheets-Sheet 2

INVENTOR.
PETER G. JACKSON
BY
Ervin B. Steinberg
AGENT.

2,988,689

MAGNETIC AMPLIFIER

Peter G. Jackson, Mamaroneck, N.Y., assignor to Reflectone Electronics, Inc., Stamford, Conn., a corporation of Connecticut Filed May 20, 1959, Ser. No. 814,481
12 Claims. (Cl. 323—56)

This invention relates to magnetic amplifiers and, more particularly, to devices of this kind which utilize the saturation of a magnetic core with unidirectional flux.

The prior art shows many magnetic amplifier constructions which utilize magnetic cores wound with suitable windings in order to obtain an output which is dependent upon a small control signal applied to a suitable control winding. Within recent years core materials have been developed which are especially suited for this type of operation, reference being made to the magnetic materials which exhibit a substantially rectangular hysteresis curve.

Most of these amplifier constructions require either two or more distinct magnetic cores or a single core which has two or more distinct flux paths as shown, for instance, in U.S. Patent No. 2,229,952, to Austyn L. Whiteley et al., entitled: "Magnetic Amplifier," dated January 28, 1941.

The instant invention relates to an improved design wherein a single magnetic core or a core with a single flux path is used to achieve substantially the same or similar results. In order to accomplish this task, suitable windings are provided and interconnected in such a manner that the single core magnetic amplifier can replace the prior construction employing two separate cores or a single core with two distinct flux paths. It will be apparent that a single core magnetic amplifier contributes to simplification in the construction of equipment and exhibits considerably reduced weight and space, thus being ideally suited for miniaturized assemblies. Other advantages will be apparent from the specification and features which will be described hereafter.

One of the objects of this invention is to provide a new and novel magnetic amplifier which uses a single magnetic core.

Another object of this invention is the provision of a magnetic amplifier employing a magnetic core having a single flux path.

Another object of this invention is the provision of a magnetic amplifier having a saturable core reactor, the output characteristic of the amplifier being dependent upon the polarity of the unidirectional saturating flux.

Another object of this invention is the provision of a new and improved magnetic amplifier producing a controllable unidirectional output potential which may be applied to the control electrodes of vacuum tubes, transistors, thyratrons or controlled diodes.

Another and further object of this invention is the provision of a magnetic amplifier control system which controls a pair of standard relays in such a way as to produce a control system which is the equivalent of a sensitive polarized relay.

Another and further object of this invention is the provision of a magnetic amplifier control system which controls the direction of rotation of a motor in such a way as to produce a servo mechanism which is the equivalent of a remotely controlled positioning device.

Another and still further object of this invention is the provision of means for producing an alternating current signal having a frequency which is twice the frequency of the alternating current source energizing the circuit.

A still other and further object of this invention is the provision of a magnetic amplifier which occupies a minimum amount of space to enable its use in miniaturized assemblies.

The invention will be better understood from the following description taken in conjunction with the accompanying drawings in which.

Figure 1:
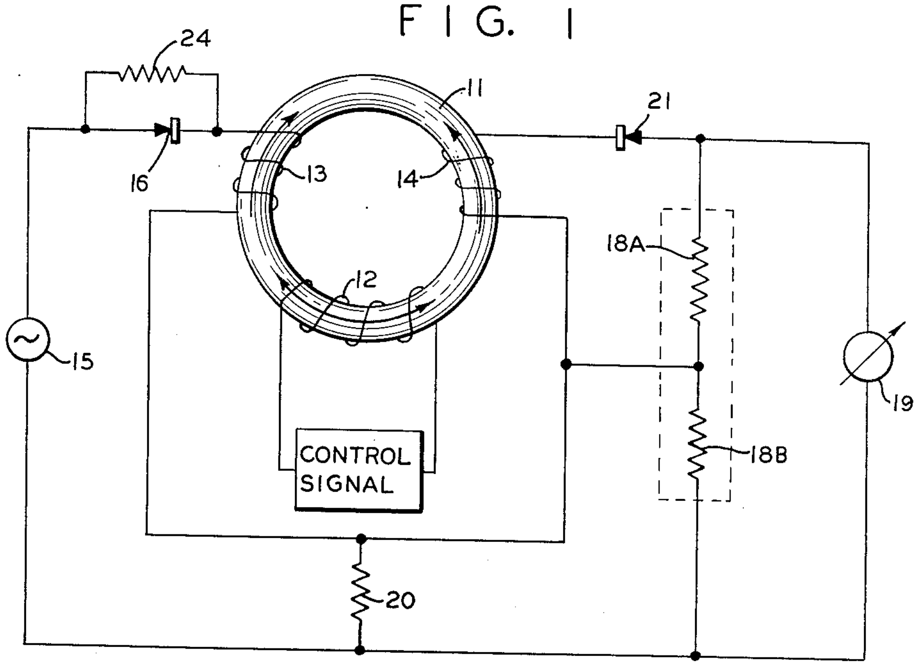
FIGURE 1 is a schematic circuit diagram of an embodiment of the present invention for producing an amplified output potential which reverses its polarity when the polarity of the control signal is reversed.

Referring now to the drawings, and more particularly to FIGURE 1, the core of a magnetic amplifier is shown which, by way of example, comprises a single toroidal core 11. It will be apparent that a single core of rectangular or square configuration would serve for the same purpose. The core is provided with a control winding 12 and a pair of controlled windings, numerals 13 and 14. Controlled winding 13 is connected in series with a source of alternating current 15 in a separate branch circuit, which contains an asymetrical conducting device 16 e.g. copper oxide, selenium, or diode rectifier, a dropping resistor 20 and a load resistor 18B in parallel with a resistor 20. Source 15 may comprise a sine wave generator or another periodic wave generator such as a square wave generator, etc. Controlled winding 14 is connected in another branch which includes load resistor 18A and a serially connected asymetrical conducting device 21. The asymetrical conducting devices are arranged and selected in such a manner that during one half wave of said alternating current source, now considered positive wave, current is permitted to flow from source 15 through rectifier 16, through controlled winding 13 and through parallel resistors 20 and 18B in one branch, and by mutual inductance through controlled winding 14, resistor 18A and rectifier 21 in the other branch. During the other half wave of source 15 resistor 24 connected across rectifier 16 enables current flow through controlled winding 13, while rectifier 21 substantially blocks current flow through winding 14. Resistor 24, therefore, acts as a biasing means and permits core 11 to become reset. Resistor 24 is so selected that core 11 becomes saturated when the ninety degree point is reached during that half wave of source 15 which causes current flow through both controlled windings. The controlled windings, furthermore, are so arranged on the core that the pulsating unidirectional fluxes which they produce in the core are in the opposite directions with respect to one another as indicated by the arrows marked on the core. Control winding 12 is energized by a signal source which may be varied in magnitude and also reversed in polarity by any suitable means as apparent in FIGURES 2 and 3.

Figure 3:
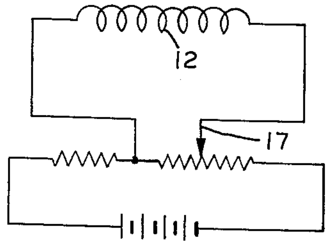
FIGURE 3 is a schematic circuit diagram showing an alternate embodiment of the supply for providing the control signal.
Figure 2:
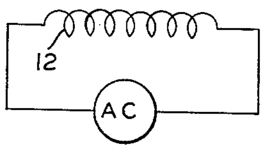
FIGURE 2 is a circuit diagram of a typical control signal supply for energizing the control winding.

In FIGURE 2 control winding 12 is connected to a suitable alternating current supply whose amplitude may be varied. In FIGURE 3 control winding 12 is energized by a unidirectional current supply which is variable in magnitude and also reversible in polarity by moving slide wire 17 with respect to a fixed center tap.

Circuit elements 18A and 18B, shown by way of example, as resistors serve as a conventional summing network. The sum of the voltage drops across the resistors is impressed upon voltmetric electroresponsive device 19 of any suitable form such as an ordinary voltmeter, the control electrode of a vacuum tube, a transistor or other instrumentality.

Figure 4:
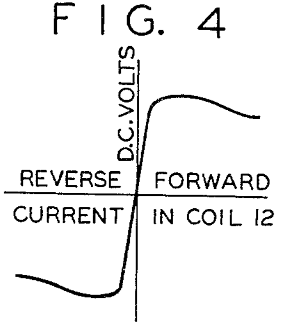
FIGURE 4 is a graph illustrating the operating characteristics of the magnetic amplifier per FIGURE 1.
Figure 8:
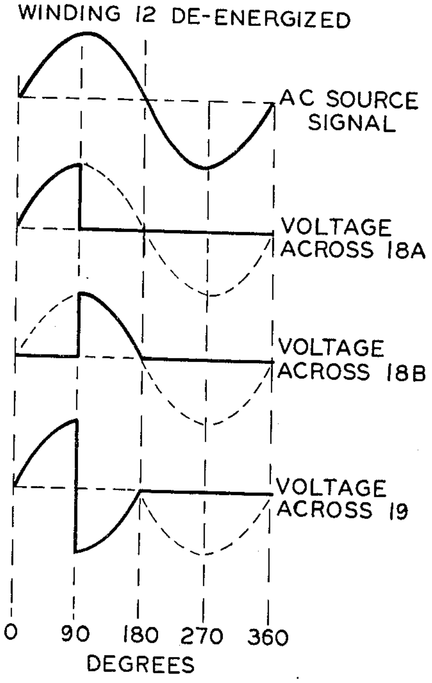
FIGURE 8 is a graph explaining still a further modification in which an alternating current signal is produced having a frequency double that of the alternating current source supplying the circuit in FIGURE 1.
Figure 9:
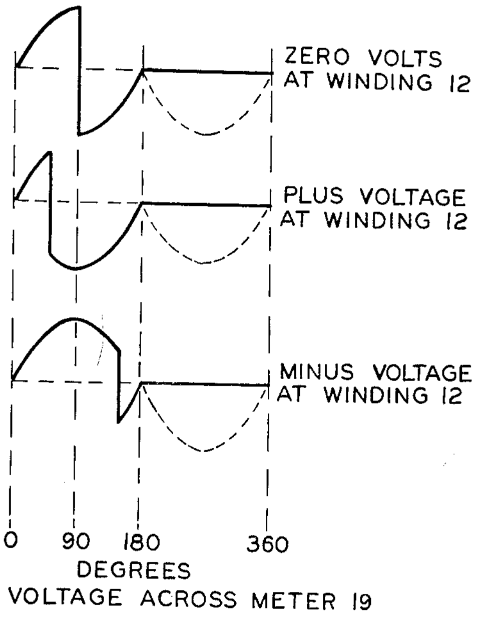
FIGURE 9 is a graph which illustrates the operating characteristic of the magnetic amplifier when used as depicted in FIGURES 1, 5 or 7.

The operation of the device per FIGURE 1 can best be understood by reference to FIGURE 4 wherein the sum of the voltage drops through resistors 18A and 18B is plotted as a function of the current in control winding 12, and FIGURE 9 in which the individual voltage drops across resistors 18A and 18B are indicated as a function of the voltage applied to the control winding 12. As seen in these figures, the sum of the D.C. voltages across resistors 18A and 18B is zero when the control current applied to winding 12 is zero. Resistor 24 is selected so that the core will saturate at the ninety degree point of source 15. Until this point is reached, the core acts as a simple transformer presenting a voltage drop across resistor 18A (FIGURE 9). When the ninety degree point is reached, the core becomes saturated and current flow will increase rapidly presenting between 90 and 180 degrees a voltage drop across resistors 20 and 18B, see FIGURES 8 and 9. As the control current increases in what is labeled the "forward direction," that is to say, the direction which causes the flux produced by control winding 12 to be in the same direction as the flux produced by the winding 13, core 11 will be rapidly saturated before ninety degrees due to the cumulative action of windings 12 and 13, thus reducing the reactance of winding 13 and increasing the current in resistor 18B, while the output voltage produced by winding 14 decreases hence decreasing the voltage across resistor 18A. In this manner, as the control current increases in the forward direction, the current in one controlled winding and its serially connected resistor increases more rapidly than the current in the other controlled winding and its associated resistor so that the sum of the voltages increases with a given polarity. If now the polarity of the control current is reversed, the effect on resistors 18A and 18B is interchanged and the resultant voltage across these two resistors again increases with increasing control signal. In this manner, a reversible polarity unidirectional potential can be obtained and controlled by means of a relatively small reversible control current at winding 12.

It should, of course, be understood that the currents in the resistors 18A and 18B are out of time phase so that the current in one resistor is at a maximum when the current in the other resistor is at its minimum. Consequently, the individual instantaneous voltage drops across the resistors 18A and 18B do not add arithmetically. However, they will almost add arithmetically in a device having a relatively large time constant such as ballistic instrument 19. FIGURE 4 may also be taken as representative of the instantaneous voltage drops across resistors 18A and 18B.

The principal reason that the output voltage registered on instrument 19 increases so rapidly which changes in current in the forward direction in winding 12 is due to a regenerative or feedback effect which occurs when the current in winding 13 increases thereby producing a magnetic flux which aids the saturating effect caused by control winding 12.

Figure 5:
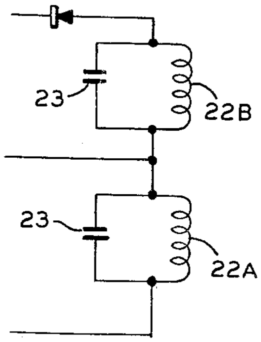
FIGURE 5 is a modification of the circuit per FIGURE 1 in which the amplified output potential is used for producing the effect of a polarized relay.

In FIGURE 5 load resistors 18A and 18B are replaced by windings 22A and 22B which, for example, may be considered the operating windings of conventional relays or contactors. Capacitors 23 are connected in parallel with windings 22A and 22B to smoothen the voltage ripple thereacross.

Figure 6:
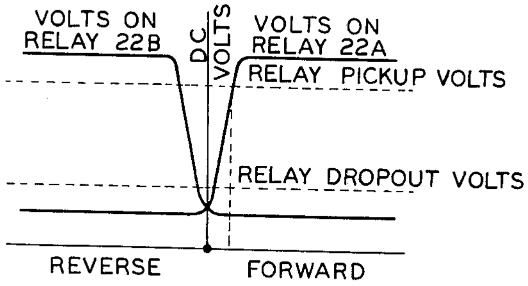
FIGURE 6 is a graph illustrating the operating characteristic of FIGURE 5.

The operating characteristic of this circuit is shown in FIGURE 6. When there is no current in the control winding 12, the voltage across both relay windings is below the dropout values of the relays so that both relays are deenergized. As the current increases slightly in a forward direction, the voltage across relay 22A increases very rapidly and soon causes the relay to become energized whereas the voltage across relay 22B decreases slightly. Similarly, if the current through the control winding 12 increases slightly in the reverse direction, the opposite effect takes place and relay 22B becomes energized and relay 22A remains deenergized. In this manner, an arrangement is produced which is the equivalent of a sensitive polarized relay, although the actual relays which are employed are inexpensive and rugged standard non-polarized relays or contactors.

Figure 7:
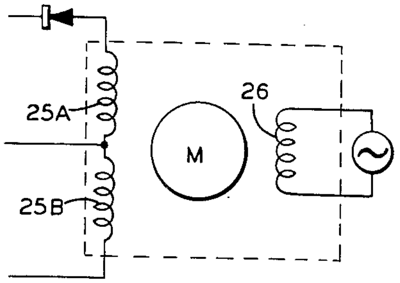
FIGURE 7 is a further modification of the circuit diagram shown in FIGURE 1 wherein the amplified output potential is used for controlling a bidirectional servo motor.

In FIGURE 7 the resistors of FIGURE 1 have been replaced by a center-tapped servo motor winding comprising winding halves 25A and 25B. The reference field 26 of the motor is energized by an alternating current source of the same frequency as source 15. When no voltage is applied to winding 12, the motor will not rotate since the sum of the voltages across windings 25A and 25B is zero, see FIGURE 9. As soon as voltage is applied to control winding 12, a resultant voltage will be present across windings 25A and 25B of the same frequency as is applied to the reference field of motor winding 26. Hence the motor will rotate in one direction. If the polarity of the voltage applied to this winding 12 is reversed, the direction of the rotation of the motor will reverse because the resultant output signal across windings 25A and 25B is of opposite polarity.

FIGURE 8 shows the use of the instant magnetic core device as a voltage doubler. This feature is accomplished by leaving control winding 12 in FIGURE 1 deenergized. The top wave form in FIGURE 8 shows the A.C. source signal. The intermediate graphs show the resultant voltages across each of the resistors, and the bottom graph shows the wave form across the summing network, that is, the voltage as seen by instrument 19. It will be apparent that the voltage effective across instrument 19 has twice the frequency of the A.C. source applied and that the sum of the portions above the reference line equals the sum of the portions below the reference line.

It should be noted that instead of a separate bypass resistor 24 connected across rectifier 16, the device may be dimensioned in such a manner that the inherent resistance of rectifier 16 in the reverse direction will serve for resetting the magnetic core. In this manner resistor 24 may be omitted.

In an alternate manner, a third controlled winding may be wound on core 11 which in series with a resistor and rectifier is connected directly across source 15. This third controlled winding by virtue of its rectifier receives current from the source 15 during the negative half wave only thereby producing magnetic flux in core 11 which resets the core for the ensuing positive half wave when current is permitted to flow through windings 13 and 14.

While there have been described certain embodiments and features of the present invention, it will be apparent to those skilled in the art that various other modifications and changes may be made therein without deviating from the intent and spirit of the invention which shall be limited only by the scope of the appended claims.

What is claimed is:

1. A magnetic amplifier including a summing means, the combination of: a core of magnetic material having a definite saturation characteristic and being constructed to have a single flux path; a control winding on said core;

a supply of electrical energy connected to said control winding for causing electrical energy to flow therethrough; a first and a second controlled winding on said core and each of said controlled windings being connected in series with a separate portion of said summing means; a source of alternating current connected in series with said first winding; circuit means connected to said controlled windings to permit current flow in both controlled windings during one half wave of said alternating current source and current flow in said first controlled winding only during the other half wave of said alternating current source; said controlled windings being so arranged that the fluxes they produce in said core are in opposite direction, and the summing means producing a signal responsive to the electrical current passing through its separate portions.

2. A magnetic amplifier including a summing means, the combination of: a core of magnetic material having a definite saturation characteristic and being constructed to have a single flux path; a control winding on said core; a supply of electrical energy connected to said control winding for causing electrical energy to flow therethrough; a first and a second controlled winding on said core and each of said controlled windings being connected in series with a separate portion of said summing means; a source of alternating current connected in series with said first winding; separate unidirectional conducting devices connected in series with each of said controlled windings to permit current flow in both controlled windings during one half wave of said alternating current source; circuit means in series with said first winding additionally permitting current flow in said first winding during the other half wave of said alternating current source; said controlled windings being so arranged that the fluxes they produce in said core are in opposite direction, and the summing means producing a signal responsive to the electrical current passing through its separate portions.

3. A magnetic amplifier including a summing means, the combination of: a core of magnetic material having a definite saturation characteristic and being constructed to have a single flux path; a control winding on said core; a circuit for energizing said control winding with selectively variable magnitude current; a first and a second controlled winding on said core and each of said controlled windings being connected in series with a separate portion of said summing means; a source of alternating current connected in series with said first winding; separate unidirectional conducting devices connected in series with each of said controlled windings to permit current flow through both controlled windings during one half wave of said alternating current source; circuit means in series with said first winding additionally permitting current flow in said first winding during the other half wave of said alternating current source; said controlled windings being so arranged on said core that the fluxes they produce in said core are in opposite direction, and the summing means producing across its terminals a signal responsive to the electrical current passing through its separate portions.

4. A magnetic amplifier including a summing means, the combination of: a core of magnetic material having a definite saturation characteristic and being constructed to have a single flux path; a control winding on said core; a circuit for energizing said control winding with selectively variable magnitude current; a first and a second controlled winding on said core and each of said controlled windings being connected in series with a separate portion of said summing means; a source of alternating current connected in series with said first winding; separate unidirectional conducting devices connected in series with each of said controlled windings so as to cause positive half waves of current from said alternating current source to flow through each controlled winding; means causing negative half waves from said source to flow through the first winding only; said controlled windings being so arranged on said core that the fluxes they produce in said core in response to the positive half waves are in opposite direction, and said separate portions of the summing means connected to one another to sum the current flow through the respective windings, whereby the summing means has its energization selectively oppositely varied in accordance with the direction of current in said control winding.

5. A magnetic amplifier including a summing means, the combination of: a core of magnetic material having a definite saturation characteristic and being constructed to have single flux path; a control winding on said core; a circuit for energizing said control winding with selectively variable magnitude current; a first and a second controlled winding on said core and each of said controlled windings being connected in series with a separate portion of said summing means; a source of alternating current connected in series with said first winding; separate unidirectional conducting devices connected in series with each of said controlled windings so as to cause positive half waves of current from said alternating current source to flow through each controlled winding; means causing negative half waves from said source to flow through the first winding only; said controlled windings being so arranged on said core that the fluxes they produce in said core in response to the positive half waves are in opposite direction, and said separate portions of the summing means connected to one another to sum the current flow through the respective windings whereby the summing means has its energization varied in accordance with the magnitude of current in said control winding.

6. In a device of the type described, the combination of: a core of magnetic material having a definite saturation characteristic and being constructed to have a single flux path; a summing means; a first and a second controlled winding on said core and each of said controlled windings being connected in series with a separate portion of said summing means; a source of alternating current connected in series with said first winding; circuit means connected to said controlled windings to cause positive half waves of current from said alternating current source to flow through each controlled winding and negative half waves to flow through the first winding only; said controlled windings being so arranged that the fluxes they produce in said core are in opposite direction; said portions connected to one another for summing the current flow in said controlled windings, and means responsive to the sum of the voltage across said summing means connected thereto to receive a voltage which has twice the frequency of said source.

7. A magnetic amplifier including a summing means, the combination of: a core of magnetic material having a definite saturation characteristic and being constructed to have a single flux path; a control winding on said core; a supply of electrical energy connected to said control winding for causing electrical energy to flow therethrough; a first and a second controlled winding on said core and each of said controlled windings being connected in series with a separate portion of said summing means and arranged so that the fluxes which the windings produce in said core are in opposite direction; a source of alternating current connected in series with said first winding; asymetrical conducting means connected to said controlled windings to permit current flow in both controlled windings during one half wave of said alternating current source; additional circuit means connected to said source to cause during the other half wave of said source magnetic flux in said core to reset the core; said portions connected to one another for summing the current flow through said controlled windings, and electrical circuit means responsive to the sum of the voltage occurring across said summing means connected to said summing means.

8. A magnetic amplifier including a summing means, the combination of: a core of magnetic material having a definite saturation characteristic and being constructed to have a single flux path; a control winding on said core; a supply of electrical energy connected to said control winding for causing electrical energy to flow therethrough; a first and a second controlled winding on said core and each of said controlled windings being connected in series with a separate portion of said summing means and said controlled windings being arranged so that the fluxes they produce in said core are in opposite direction; a source of alternating current connected in series with said first winding; asymetrical conducting means connected to said controlled windings to permit current flow in both controlled windings during one half wave of said alternating current source; additional circuit means connected to said source to cause during the other half wave of said source magnetic flux in said core to reset the core; said portions connected to one another for summing the current flow through said controlled windings, and said additional circuit means comprising a third controlled winding on said core.

9. In a magnetic amplifier including a summing means, the combination of: a core of magnetic material having a definite saturation characteristic and being constructed to have a single flux path; a control winding on said core; a supply of electrical energy connected to said control winding for causing electrical energy to flow therethrough; a first and a second controlled winding on said core and each of said controlled windings being connected in series with a separate portion of said summing means and said controlled windings being arranged so that the fluxes they produce in said core are in opposite direction; a source of alternating current connected in series with said first winding, asymetrical conducting means connected in series with each of said controlled windings to permit current flow in both controlled windings during one half wave of said alternating current source; additional circuit means connected to said source to cause during the other half wave of said source magnetic flux in said core to reset the core; said portions connected to one another for summing the current flow in said controlled windings and hence forming a summing means, and said additional circuit means comprising a resistive element disposed in parallel with the asymetrical conducting means in said first winding.

10. In a magnetic amplifier including a summing means, the combination of: a core of magnetic material having a definite saturation characteristic and being constructed to have a single flux path; a control winding on said core; a supply of electrical energy connected to said control winding for causing electrical energy to flow therethrough; a first and a second controlled winding on said core and arranged so that the fluxes they produce in said core are in opposite direction; a source of alternating current connected in series with said first winding; asymetrical conducting means connected to said controlled windings to permit current flow in said first winding during one half of said alternating current source and by mutual inductance in said second winding during the identical half wave portion; additional circuit means connected to said source to cause during the other half wave thereof magnetic flux in said core which resets the core; a summing network connected to said first and second controlled windings whereby each of said windings is serially connected with a separate portion of said summing network, and said summing network producing a voltage thereacross responsive to the current flow through said portions.

11. A magnetic amplifier including a summing means, the combination of: a core of magnetic material having a definite saturation characteristic and being constructed to have a single flux path; a control winding on said core which is adapted to receive electrical energy; a first and a second controlled winding on said core and each of said controlled windings being connected in series with a separate portion of said summing means and said first winding adapted to be connected also in series with a source of alternating current; circuit means connected to said controlled windings to permit upon energizing of said first winding from said source, current flow in both controlled windings during one half wave of said alternating current source and current flow in said first controlled winding only during the other half wave of said alternating current source; said controlled windings being so arranged that the fluxes they produce in said core are in opposite direction, and the summing means producing a signal responsive to the electrical current passing through its separate portions.

12. A magnetic amplifier including a summing means, the combination of: a core of magnetic material having a definite saturation characteristic and being constructed to have a single flux path; a control winding on said core which is adapted to receive electrical energy and produce a magnetic flux in said core; a first and a second controlled winding on said core and each of said controlled windings being connected in series with a separate portion of said summing means and said first winding adapted to be connected also in series with a source of alternating current; circuit means connected to said controlled windings to permit upon energizing of said first controlled winding from said source, current flow in both controlled windings during one half wave of said alternating current source and current flow in said first controlled winding only during the other half wave of said alternating current source; said controlled windings being so arranged that the fluxes they produce in said core are in opposite direction, and the summing means producing a signal responsive to the electrical current passing through its separate portions and responsive to the flux established by said control winding.

References Cited in the file of this patent

UNITED STATES PATENTS

| | | |
|---|---|---|
| 2,754,470 | Franklin | July 10, 1956 |
| 2,809,241 | Weissman | Oct. 8, 1957 |